(12) United States Patent
Gagne et al.

(10) Patent No.: US 10,876,741 B2
(45) Date of Patent: Dec. 29, 2020

(54) BOILER INTEGRATED CONTROL WITH NON-LINEAR OUTDOOR RESET METHODOLOGY

(71) Applicant: Lochinvar, LLC, Lebanon, TN (US)

(72) Inventors: Curtis George Gagne, Smyrna, TN (US); John Paine, Brentwood, TN (US); Daniel Mitchell, Lebanon, TN (US); Robert Wiseman, Brentwood, TN (US)

(73) Assignee: Lochinvar, LLC, Lebanon, TN (US)

( * ) Notice: Subject to any disclaimer, the term of this patent is extended or adjusted under 35 U.S.C. 154(b) by 865 days.

(21) Appl. No.: 15/259,142

(22) Filed: Sep. 8, 2016

(65) Prior Publication Data

US 2018/0066854 A1    Mar. 8, 2018

(51) Int. Cl.
  *F24D 19/10* (2006.01)
  *F24H 8/00* (2006.01)
(52) U.S. Cl.
  CPC ........... *F24D 19/1009* (2013.01); *F24H 8/00* (2013.01); *Y02B 30/00* (2013.01)
(58) Field of Classification Search
  CPC ...... F24D 19/1009; F24H 8/00; Y02B 30/102
  USPC ......................................................... 237/8 A
  See application file for complete search history.

(56) References Cited

U.S. PATENT DOCUMENTS

| | | | |
|---|---|---|---|
| 4,516,720 A | 5/1985 | Chaplin | |
| 4,557,417 A | 12/1985 | Ruby | |
| 4,824,014 A * | 4/1989 | Stuch | G05D 23/1931 236/91 F |

(Continued)

FOREIGN PATENT DOCUMENTS

| | | |
|---|---|---|
| DE | 10345301 A1 | 4/2005 |
| DE | 102013014832 A1 | 3/2015 |

(Continued)

OTHER PUBLICATIONS

International Search and Opinion for International application No. PCT/US2017/042723 dated Nov. 2, 2017, 20 pages (not prior art).

(Continued)

*Primary Examiner* — Steven B McAllister
*Assistant Examiner* — John E Bargero
(74) *Attorney, Agent, or Firm* — Lucian Wayne Beavers; Gary L. Montle; Patterson Intellectual Property Law, PC

(57) ABSTRACT

A hydronic water heating system heats water for various types of heat emitters. A boiler assembly includes a user interface which receives user-defined water temperature set point corresponding to a minimum outdoor temperature, and an integrated controller generates a nonlinear outdoor reset curve between the user-defined set point and a second set point corresponding to maximum outdoor temperature for which heating is required, and regulates the boiler to heat water to a temperature corresponding to a set point along the nonlinear output reset curve and based on a detected outdoor temperature. The nonlinear outdoor reset curve may be generated based on aggregated heat output functions for various types of heat emitters. A linear outdoor reset curve may be generated between a maximum water temperature set point and the user-defined set point, having a slope equal to an instantaneous slope of the nonlinear outdoor reset curve at the user-defined set point.

33 Claims, 8 Drawing Sheets

(56) References Cited

U.S. PATENT DOCUMENTS

| | | |
|---|---|---|
| 5,125,572 A | 6/1992 | Piegari |
| 5,556,027 A | 9/1996 | Fiedrich |
| 6,062,485 A | 5/2000 | Stege et al. |
| 6,507,774 B1 | 1/2003 | Reifman et al. |
| 6,536,678 B2 | 3/2003 | Pouchak |
| 7,506,617 B2 | 3/2009 | Paine |
| 7,590,470 B2 | 9/2009 | Caves et al. |
| 7,658,335 B2 | 2/2010 | Johnson, Jr. |
| 7,784,705 B2 | 8/2010 | Kasper et al. |
| 8,757,509 B2 | 6/2014 | Anderson et al. |
| 2011/0259322 A1 | 10/2011 | Davis et al. |
| 2013/0099014 A1 | 4/2013 | Kovalcik et al. |
| 2013/0126627 A1 | 5/2013 | Paine |
| 2014/0048244 A1 | 2/2014 | Wallace |
| 2015/0167989 A1* | 6/2015 | Matsuoka ............... F24D 19/10 700/276 |
| 2015/0204580 A1* | 7/2015 | Evans ................... F24H 9/2007 122/14.1 |
| 2017/0219219 A1* | 8/2017 | Miller ................. F24D 19/1012 |
| 2018/0039292 A1* | 2/2018 | van Berkel ............. F24F 11/30 |
| 2018/0135868 A1* | 5/2018 | Johnson, Jr. .......... G06F 9/4482 |
| 2019/0072990 A1* | 3/2019 | Mulcahy ............ G05D 23/1919 |

FOREIGN PATENT DOCUMENTS

| | | |
|---|---|---|
| EP | 132663 A2 | 2/1985 |
| EP | 1300634 A1 | 4/2003 |
| EP | 2009537 A2 | 12/2008 |

OTHER PUBLICATIONS

Tekmar Control Systems Ltd., (Mar. 2009) Data Brochure—Boiler Control 260 (20 pp.).

Honeywell International Inc., R7910B Sola RC (Residential Control) Product Data (2008) (104 pp.).

Navien, NHB Condensing Boiler, Users Information Manual, Version: 1.1 (Nov. 4, 2014) (24 pp.).

Lochnivar, Smart System PC Program Instructions, Models: Power-Fin, Knight, Knight XL, Knight Wall Mount and Armor (Apr. 2010) (32 pp.).

Intellectual Property India Examination Report of Application No. 201917000700, dated Dec. 26, 2019, 6 pages (not prior art).

Extended European Search Report for corresponding EP 17 84 9247, dated May 13, 2020, 8 pages (not prior art).

* cited by examiner

BOILER INTEGRATED CONTROL WITH NON-LINEAR OUTDOOR RESET METHODOLOGY

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of the following patent application(s) which is/are hereby incorporated by reference: None

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to hydronic water heating systems and methods for optimizing ease of use, comfort and energy efficiency. More particularly, the present invention relates to an integrated boiler control having directly incorporated methodology for generating a non-linear outdoor reset curve derived from numerical analysis of the heat output curves of various types of heat emitters.

An important feature for water heating systems is a boiler supply temperature reset based on outdoor temperature, particularly for condensing heating boilers. With initial reference to exemplary operating ranges for various boiler systems as shown in FIG. 1, as the return water temperature falls below the flue gas dew point temperature, significant improvements in the combustion efficiency of a boiler are achieved. A boiler supply water temperature reset based on outdoor temperature serves to maximize boiler efficiency by targeting the lowest water temperature required to satisfy the heating load. Such outdoor reset methods can allow condensing operation for a significant portion of the heating season, even when using high temperature heat emitters. In addition to the energy efficiency benefits, regulatory requirements require that boilers must be capable of reducing the supply temperature set point as heating demand is reduced.

One conventional outdoor reset methodology involves using a linear reset curve to scale supply temperature set points based on the outdoor temperature. Such systems are commonly incorporated into boiler integrated controls to meet the regulatory requirements. Referring now to an exemplary application of this methodology as illustrated in FIG. 2, a water supply temperature of 220° F. is provided for an outdoor temperature of −10° F. In this example, it may further be determined that a desirable water supply temperature of 70° F. is provided for an outdoor temperature of 70° F. An array of supply temperature set points may accordingly be found along a linear reset curve 201 applied in accordance with or otherwise between these initial set points.

However, one prominent drawback to this approach is that many common hydronic heat emitters do not output heat to the living space in linear proportion with respect to water temperature, due to mixed convection, conduction, and radiation modes of heat transfer. In hydronic baseboard radiators, for example, heat output typically increases faster, compared to increases in water temperature, at higher water temperatures due to the fact that natural convection currents are established at higher temperatures that increase the output of heat. In other words, an array of water supply temperatures as required to satisfy a load for a given outdoor temperature takes on a non-linear configuration 202 between the end points. For this reason, boiler control systems with linear reset curve implementation must set the water temperatures higher on warm days than necessary to ensure comfort throughout the full range of outdoor temperatures to compensate for the reduction in convective heat transfer, as illustrated with the linear reset curve 203. Accordingly, such systems are unable to run at optimal efficiency.

Another challenge of such systems is the complication of compensating for the non-linear nature of heat emitter output to maintain comfort while supplying the lowest possible water temperatures. Because the settings no longer reflect "real" physical constraints, it can be exceedingly difficult to know with confidence the required settings to achieve this.

There are stand-alone devices available on the market that will provide non-linear outdoor reset control curves. However, due to the fact that these systems are typically external to the boiler, the added cost of additional hardware must be considered, as well as the complexity of programming both the stand-alone boiler control device and the boiler integrated control to be able to work together, and the additional effort of wiring the output of the stand-alone device to the appropriate input on the boiler. It is also believed that many (if not all) of these devices require programming parameters that are not directly "real" physical constraints, or that require programming for the heat emitter types.

It would therefore be desirable to provide a boiler integrated control with incorporated non-linear reset curve methodology.

It would further be desirable that the boiler integrated controller be capable of generating the non-linear reset curve to be agnostic with respect to the type of associated heat emitter.

It would still further be desirable to provide the boiler integrated controller with reduced complexity of programming, such that virtually any user such as a homeowner can fine-tune the heating output with for example adjustment to only a single input parameter.

BRIEF SUMMARY OF THE INVENTION

An invention as disclosed herein may solve the above described problems by incorporating a non-linear outdoor reset solution in a boiler integrated control that is easily programmed using simple and familiar parameters. Various embodiments of a proposed boiler control system incorporate a method of generating a curve that closely matches the heat output of most common emitters simply by inputting three simple and familiar parameters. The first two parameters may include a first outdoor design temperature corresponding to the coldest expected outdoor temperature (e.g., as may be a standard reference value based on the associated geographic location), and a design supply water temperature required to satisfy the heat demand at the coldest outdoor design temperature (e.g., a value determined through a common heat loss evaluation). The third parameter in such an embodiment may be a desired indoor temperature (e.g., a value determined by personal indoor climate preferences).

For added simplicity, reasonable assumptions for coldest day outdoor design temperature and a reasonable assumption of desired indoor temperature can be set as default values to allow, in many cases, a satisfactory curve to be generated by inputting only a single parameter.

Additionally, this methodology allows much easier fine-tuning, even by a homeowner or user, as compared to linear outdoor reset methodologies which require a broader understanding of outdoor reset and which parameters need to be adjusted to make the desired change. In accordance with various embodiments of a heating control system as disclosed herein, the user can simply increase or decrease the design supply water temperature setting as needed to increase or decrease heat output across the full curve.

Because the proposed invention consists of a methodology for generating the reset curve based on a variety of different heat emitters, and because of the dynamic nature of the curves, there is essentially no need to program in the type of heating emitters used, as is required for many of the systems currently on the market.

In one exemplary embodiment of a hydronic water heating system according to the present disclosure, a controller is integrated within a boiler assembly having a water input and a water output. A user interface is configured to receive a user-defined water temperature set point corresponding to a reference outdoor temperature. The controller is configured to regulate the heating of water from the water input to a temperature corresponding to a set point along a nonlinear output reset curve. The output reset curve is generated in part based on the user-defined water temperature set point and comprises a first water temperature set point corresponding to a minimum outdoor temperature with respect to the defined area, a second water temperature set point corresponding to a maximum outdoor temperature for which heating is required in the defined area, and a plurality of water temperature set points between the first and second set points and corresponding to outdoor temperatures between the minimum and maximum outdoor temperatures with respect to the defined area.

In one exemplary aspect of this embodiment, the controller may be configured to generate the outdoor reset curve based further in part on aggregated data corresponding to heat output functions for a plurality of types of heat emitters, wherein the boiler assembly having the outdoor reset curve is configured to provide the water output for use with any one of the plurality of types of heat emitters.

In another exemplary aspect, the controller may be configured to generate the outdoor reset curve as a multi-order polynomial function of output water temperature corresponding to a desired indoor temperature for each of the plurality of outdoor temperatures between the minimum and maximum outdoor temperatures.

In another exemplary aspect, the controller may be configured to generate the outdoor reset curve using a fixed multi-order coefficient relative to the first and second water temperature set points. Each of the plurality of water temperature set points may be determined as a greater value of the user-defined water temperature set point or a water temperature set point corresponding to an actual outside temperature along the curve generated according to the fixed multi-order coefficient.

Alternatively, in another exemplary aspect the controller may be configured to generate the outdoor reset curve as connecting the first and second set points and a third water temperature set point comprising a midpoint between the first and second set points offset by a fixed percentage factor.

In still another exemplary aspect, the first water temperature set point and the desired indoor temperature may be predetermined and stored in association with the controller, wherein only the user-defined water temperature set point corresponding to a reference outdoor temperature is required as a user input via the user interface to generate the outdoor reset curve. The predetermined first water temperature set point may be automatically determined based on location data corresponding to a current location of the boiler assembly and obtained from a remote server via a communications network.

In still another exemplary aspect, a desired indoor temperature feedback input may be provided to the controller from the user interface, wherein the controller dynamically generates a new outdoor reset curve for changes in the desired indoor temperature.

In still another exemplary aspect, an outdoor temperature feedback loop may be configured to provide an actual outdoor temperature measurement with respect to the defined area. The outdoor temperature feedback loop may comprise at least one outdoor temperature sensor associated with a shaded outdoor area and at least one outdoor temperature sensor associated with an irradiated outdoor area. The controller may be configured to dynamically adjust at least the second water temperature set point and the corresponding output reset curve based on actual outdoor temperature measurements from the outdoor temperature sensors.

The controller may be configured to determine a number of actual outdoor temperature measurements below the minimum outdoor temperature corresponding to the first water temperature set point, and dynamically adjust the minimum outdoor temperature, the first water temperature set point and the outdoor reset curve based on the determined number exceeding a threshold value.

In still another exemplary aspect, the controller may be configured to generate a linear outdoor reset curve between a maximum water temperature set point and the first water temperature set point, wherein a slope of the linear outdoor reset curve is equal to an instantaneous slope of the nonlinear outdoor reset curve at the first water temperature set point.

In another exemplary aspect, a thermostat cycling feedback loop may be provided wherein the controller is further configured to dynamically adjust at least the first water temperature set point and the corresponding output reset curve based on a thermostat cycling input.

In another exemplary aspect, an indoor temperature feedback loop is configured to provide an actual indoor temperature measurement with respect to the defined area, wherein the controller may be configured to compare actual indoor temperature measurements to expected indoor temperature measurements for a respective outdoor temperature and water temperature, and dynamically adjust at least the second water temperature set point and the corresponding outdoor reset curve based on detected changes in the indoor temperature.

In another embodiment of a hydronic water heating system as disclosed herein for use in a defined area, a user interface is configured to receive a user-defined water temperature set point corresponding to a minimum outdoor temperature with respect to the defined area. A controller is integrated within the boiler assembly and configured to generate a nonlinear outdoor reset curve between the user-defined water temperature set point and a second water temperature set point corresponding to a maximum outdoor temperature for which heating is required in the defined area. An outdoor temperature is detected based on input from an outdoor temperature feedback loop, and the controller regulates the heating of water from the water input to a temperature corresponding to a set point along the nonlinear output reset curve and based on the detected outdoor temperature.

DETAILED DESCRIPTION OF THE INVENTION

Figure 1:
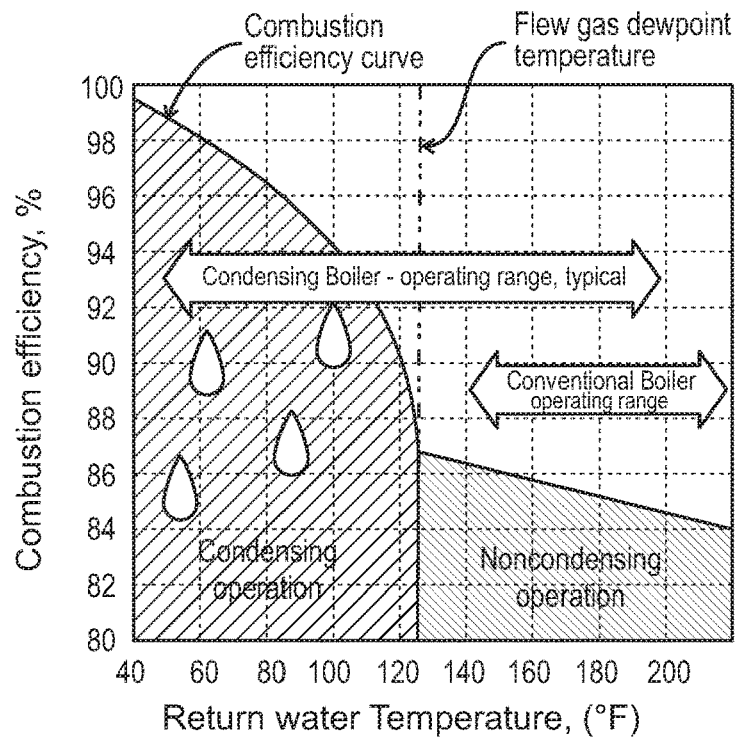
FIG. 1 is a graphical diagram illustrating combustion efficiency of a conventional boiler with respect to return water temperature.
Figure 2:
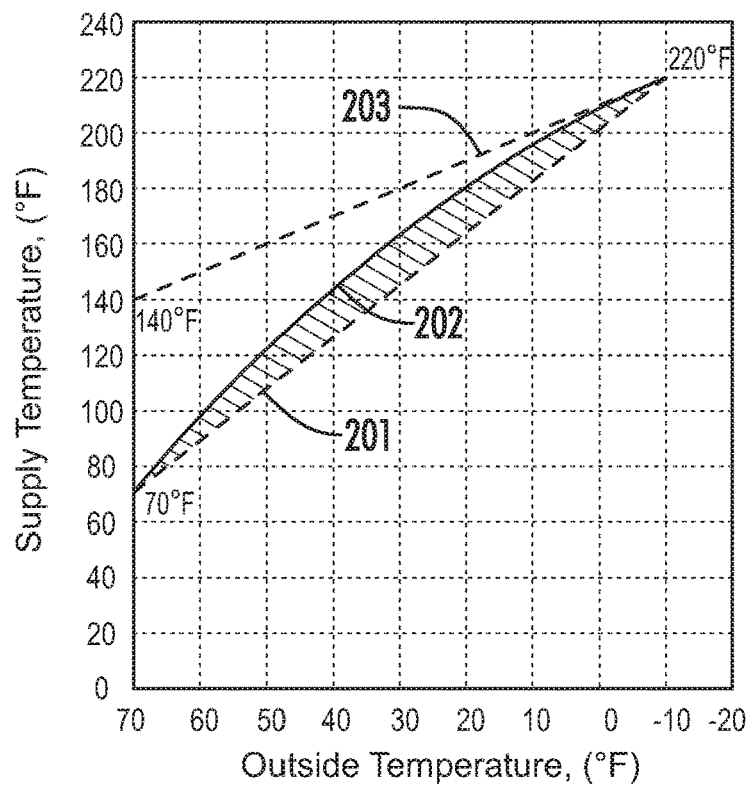
FIG. 2 is a graphical diagram illustrating various linear and non-linear reset curves for supply temperature with respect to outdoor temperature.

Referring generally to FIGS. 3-14, various exemplary embodiments of an invention may now be described in detail. Where the various figures may describe embodiments sharing various common elements and features with other embodiments, similar elements and features are given the same reference numerals and redundant description thereof may be omitted below.

Briefly stated, various embodiments of an integrated boiler heating control as disclosed herein may directly incorporate a methodology for generating a non-linear (e.g., second order polynomial) outdoor reset curve derived from numerical analysis of the heat output curves of various heat emitters, with the primary intention of optimizing ease of use, comfort and energy efficiency in residential hydronic heating applications. This methodology may allow an installer or equivalent user to configure an outdoor reset curve by setting only three parameters, such as for example: coldest design day outdoor temperature, water temperature required for the coldest design day, and the maximum allowable set point to prevent damage to the heating system.

Figure 3:
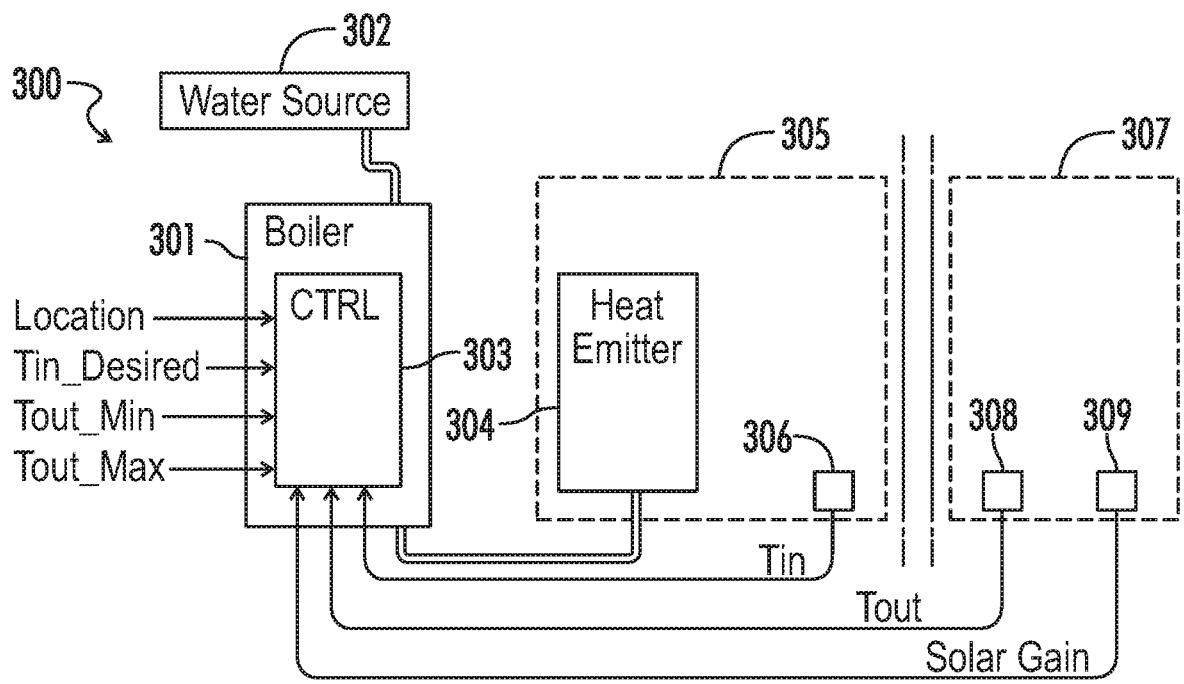
FIG. 3 is a block diagram representing an exemplary heating system according to an embodiment of the present disclosure.

Referring now to FIG. 3, an exemplary hydronic heating system 300 may include a boiler assembly 301 configured to receive water from a water source and to provide a heated water output via a controlled heating element to a heat emitter in a defined area 305 such as for example a building or an enclosed room therein. An integrated boiler controller 303 is configured to regulate the heating element based on various input parameters including a water supply temperature set point determined from a non-linear reset curve as described herein. An "integrated boiler controller" as described herein may generally be considered as a controller incorporated into the boiler that implements both of temperature control and comfort control features, as well as an ignition control.

In certain embodiments of a hydronic heating system as disclosed herein the boiler assembly may include a tank, a primary combustion heat exchanger or the like. In other embodiments within the scope of the present disclosure and as more particularly closed-loop in nature, the boiler assembly includes a primary heat exchanger wherein water is circulated via the water output to a heat emitter and then back to the primary heat exchanger via a water return or water input. In still other embodiments within the scope of the present disclosure, a combustion heat exchanger may be implemented comprising a combustion burner and a water to gas heat exchanger to transfer the heat. The controller 303 may be coupled to or otherwise configured to receive inputs from a user interface or external input sources, such inputs including for example but without limitation a geographical or physical location of the boiler assembly, a desired indoor temperature ($T_{in\_desired}$), a minimum expected outdoor temperature for the location ($T_{out\_min}$), a maximum expected outdoor temperature for which heating is required by the boiler system ($T_{out\_max}$), etc. A user interface as discussed herein may include for example but without limitation a display unit such as a Liquid Crystal Display (LCD) having associated buttons, fields, tabs, pointers or the like and functionally linked to the controller for electronically conveying user input via the interface. In various embodiments a user interface as discussed herein may further include or encompass remote interfaces such as for example may be linked in wireless fashion to the controller via a communications network, or still further via a remote server.

The terms "controller," "control circuit" and "control circuitry" as used herein may refer to, be embodied by or otherwise included within a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed and programmed to perform or cause the performance of the functions described herein. A general purpose processor can be a microprocessor, but in the alternative, the processor can be a microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable medium known in the art. An exemplary computer-readable medium can be coupled to the processor such that the processor can read information from, and write information to, the memory/storage medium. In the alternative, the medium can be integral to the processor.

Figure 4:
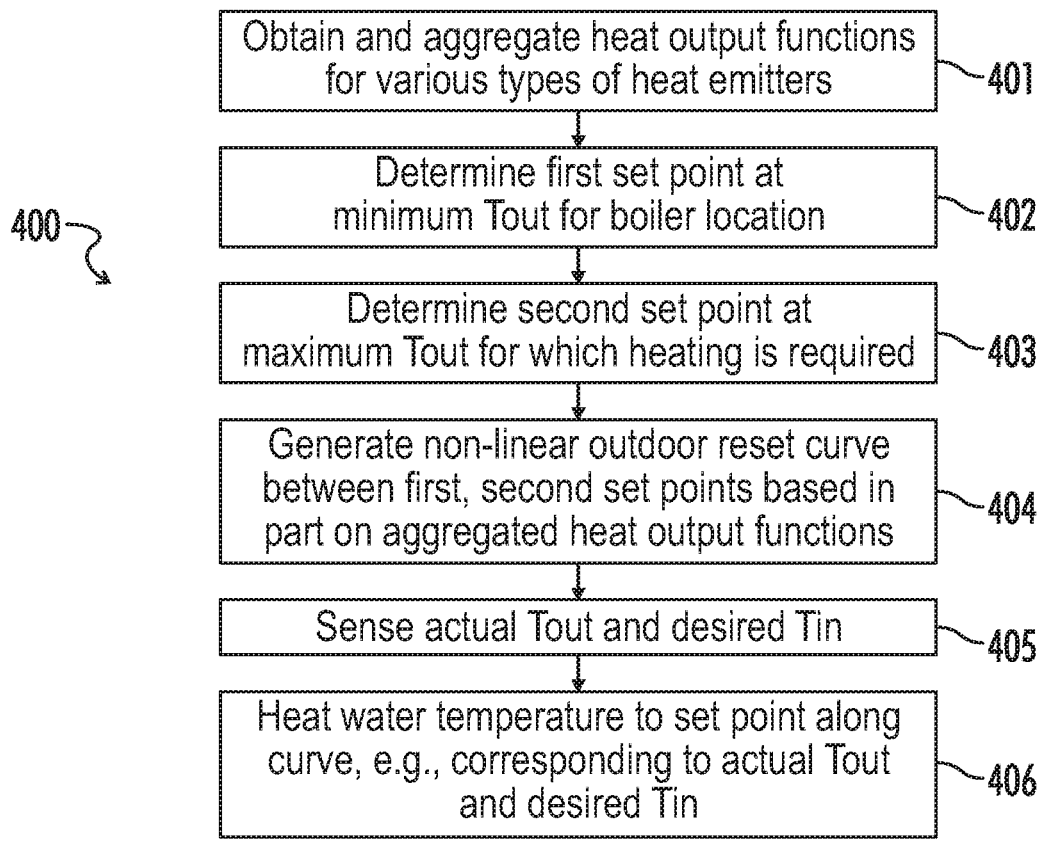
FIG. 4 is a flowchart representing an exemplary heating process according to an embodiment of the present disclosure.

Referring to FIG. 3 and further to FIG. 4, an exemplary methodology for the boiler system may be described in detail. One preliminary step 401 may include, due for example to the highly non-linear nature of certain heat emitters such as baseboard radiators, obtaining and optionally aggregating heat output functions generated from published data for a number of such heat emitters. Where this information is previously obtained or otherwise stored in association with the controller, the resulting heat output functions may be implemented in feed-forward fashion for deriving non-linear reset curves that are substantially agnostic to emitter-type. This step may optionally be omitted or modified, however, wherein information corresponding to an actual heat output function for a particular heat emitter is provided in a feedback loop to the controller and dynamically integrated into subsequently non-linear reset curves for that heat emitter.

The methodology further requires the controller to determine or otherwise identify relevant set points as bounds for the non-linear reset curve. To better illustrate certain relevant background conditions for such determinations by the boiler control as disclosed herein, consider a hydronic heating system in which a building loses heat from the indoor environment to the outdoors while the indoor environment also gains heat from heated water supplied to the hydronic heating system.

In general, the heat loss from the defined area or associated building is driven by a temperature gradient between the outdoor and indoor environments. While other factors such as solar gain can be a factor, as discussed later, these are not considered here for the sake of simplicity. The heat loss from the building can then be considered a function of the difference between indoor temperature ($T_{in}$) and outdoor temperature ($T_{out}$), and can be assumed to be of the following form:

$$f(T_{in}-T_{out})=k(T_{in}-T_{out}) \tag{Eq. 1}$$

In general, the heat gain from the heated water in the hydronic heating system is driven primarily by a temperature gradient between the water and the indoor environment. Other factors affect the heat gain from the hydronic heating system, such as water flow rate, but these can be neglected in the present discussion as they will be considered as constant for a given system. In the case of flow rate, for example, this assumption is reasonable for installations that do not use variable speed pumps. Therefore, the heat gain from the hydronic heating system can be considered a function of the difference between supply water temperature ($T_{water}$) and indoor temperature:

$$g(T_{water}-T_{in}) \tag{Eq. 2}$$

A primary goal of a hydronic heating system is to maintain a constant indoor temperature irrespective of the current outdoor temperature. In order to maintain a constant indoor temperature, there must be no net gain or loss of heat to the indoor environment. Neglecting the effects of secondary heat gain sources and other factors, the heat loss from the building and the heat gain from the hydronic heating system conditions required to maintain a constant indoor temperature must satisfy the following expression:

$$f(T_{in}-T_{out})=g(T_{water}-T_{in}) \tag{Eq. 3}$$

Thus:

$$f(T_{in}-T_{out})-g(T_{water}-T_{in})=0 \tag{Eq. 4}$$

Because the goal is to maintain a fixed indoor temperature, the indoor temperatures in the above expression can be considered as a mathematical constant. For this reason, the above expression can be simplified to describe the conditions required to maintain any specific constant indoor temperature as shown below:

$$f(T_{out})-g(T_{water})=0 \tag{Eq. 5}$$

The set of points in the form ($T_{out}$, $T_{water}$) that satisfy the above expression are considered to be operating points capable of maintaining the given constant indoor temperature.

Because the heat loss and heat gain can be compared rather than considered independently, the actual heat transfer rates become arbitrary, and the system can be generally characterized. A generalized relation between the outdoor temperature $T_{out}$ and the corresponding water supply temperature $T_{water}$ that will satisfy the expression in Equation 5 may accordingly herein be considered an ideal or optimal outdoor reset curve.

For this reason, the controller 303 may generate an optimal outdoor reset curve by determining a function that equals the water supply temperature required for a given outdoor temperature. In order to achieve this, it is helpful to consider useful boundaries within which to evaluate this outdoor reset function. Generalized boundaries may be selected to constrain the range of outdoor temperature for the function.

In step 402 of the illustrated methodology of FIG. 4, such a range is determined by first considering the minimum anticipated outdoor temperature, which may typically be available in published data for different geographic areas. This point is also conveniently used when performing a heat loss load calculation for a building, so required water temperature data corresponding to this point is also typically readily available. Therefore the first boundary condition to be used may be characterized as the following point:

$$(T_{out\_design}, T_{water\_design}) \tag{Eq. 6}$$

The second boundary condition may be determined in step 403 by the controller as the maximum anticipated outdoor temperature above which heating is no longer necessary. This point is effectively determined as the point where there is no heat loss from the building, thus requiring no heat gain from the hydronic heating system. In other words, at the second boundary condition there is no temperature gradient between the indoor to outdoor environments, and no temperature gradient between water supply and indoor environment.

$$f(0)=0 \rightarrow T_{out}=T_{in} \qquad \text{(Eq. 7)}$$

$$g(0)=0 \rightarrow T_{water}=T_{in} \qquad \text{(Eq. 8)}$$

Therefore, the second boundary condition to be used is the following point:

$$(T_{in}, T_{in}) \qquad \text{(Eq. 9)}$$

The methodology may then proceed in step 404 wherein the controller generates a non-linear reset curve, or receives a remotely generated non-linear reset curve, containing both of these points. The outdoor reset curve may in various embodiments be in the form of a multi-order polynomial, based for example on the aforementioned data from the heat emitters such as baseboard radiators. Although in examples as further described herein the multi-order polynomial may be referred to as a second order polynomial, it may be understood a polynomial may be third-order, fourth-order or the like without varying from the scope of the present disclosure. Two exemplary approaches are provided herein for generating the curves, each approach having been obtained via numerical analysis to find a generalized methodology.

The first approach involves selecting a fixed multi-order coefficient, thereby fixing the rate of change of the instantaneous slope of the reset curve. Although in examples as further described herein the multi-order coefficient may be referred to as a second order coefficient, it may be understood a coefficient may be third-order, fourth-order or the like without varying from the scope of the present disclosure. By considering a fixed second order coefficient as well as the given set of boundary conditions, a unique curve may be generated that closely matches the required outdoor reset curve for a wide variety of heat emitters and under a wide variety of conditions. In one particular example, the specific second order coefficient is identified as −0.005 (with ° F. as the temperature units), which has been found to result in a reasonable but safely conservative supply water temperature for a given outdoor temperature.

Upon fixing the rate of change of the instantaneous slope of the outdoor reset function, additional care may be required to prevent the calculated supply water temperature from starting to decrease as the outdoor temperature decreases. To accomplish this, the controller may calculate a supply water temperature that is the greater of the design water temperature or the calculated supply temperature using the determined second order polynomial curve. While one of skill in the art may consider this as a limitation on optimal curve generation, such a limitation would only apply in cases with a low design temperature. In practice, this would most commonly apply to low temperature radiant floor (wall or ceiling) heat systems. Accordingly, this feature can effectively be considered as a benefit, as design supply temperature is commonly determined by the optimal surface temperature, and therefore it may not be preferable to exceed this temperature. While arguably posing a slight disadvantage with respect combustion efficiency (as compared to the theoretically optimal curve) by reaching design supply water temperature at a warmer outdoor temperature than is theoretically required, such efficiency reduction is minimal wherein the combustion products are still be low enough to reach their dew point at the design water supply temperature, which is considered a requirement for efficient operation of a condensing hot water boiler.

Figure 5:
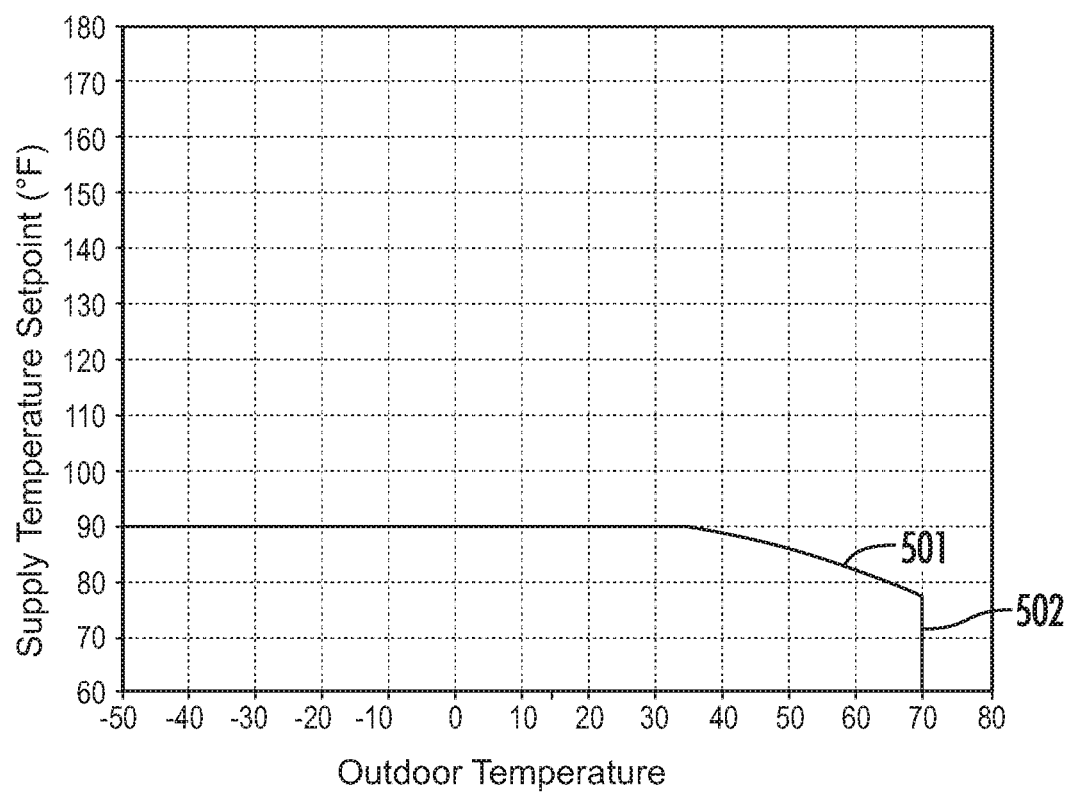
FIG. 5 is a graphical diagram representing an exemplary supply temperature limitation according to an embodiment of the present disclosure.

Referring to FIG. 5, one example of such an approach is demonstrated wherein a determined second order polynomial curve 501 terminates on one end at the maximum outdoor temperature for which heating is required 502 and further is capped on the other end by the design supply temperature of 90° F. (e.g., 90° F. by design corresponding to an outdoor temperature of 0° F.). The water supply temperature is accordingly limited to the design set point in a low temperature system to prevent the generated non-linear reset curve from generating lower water supply temperatures as the outdoor temperature continues to decrease, wherein the design supply temperature is reached at an outdoor temperature (~35° F.) that is warmer than the design outdoor temperature (0° F.).

Figure 6:
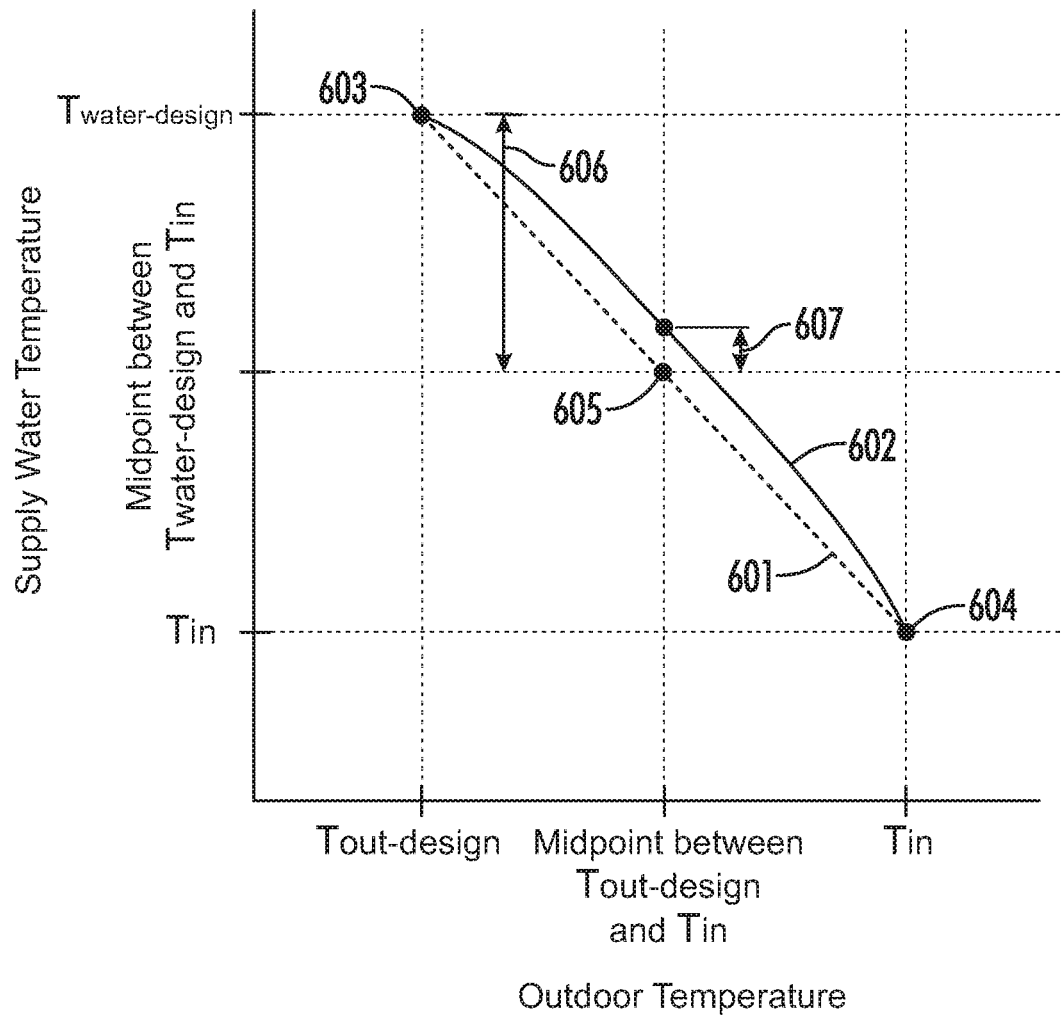
FIG. 6 is a graphical diagram representing an alternative embodiment for producing a nonlinear reset curve according to the present disclosure.

An alternative approach as represented in FIG. 6, further intended to eliminate cases where the calculated supply water temperature would start to decrease as outdoor temperature decreased, may be to generate the non-linear reset curve by fixing a third point between the maximum and minimum outdoor temperatures that would be based on a fixed factor (e.g., 16%) between the design water supply temperature (below, as $T_{dws}$) and the indoor temperature as determined by numerical analysis. Specifically, the following exemplary fixed point may be identified:

$$([(T_{out\_design}+T_{in})/2],[((T_{wds}+T_{in})/2)+16\%(T_{wds}-(T_{wds}+T_{in})/2))]) \qquad \text{(Eq. 10)}$$

That is, and with reference to the example shown, at the midpoint 605 along a linear curve 601 between design outdoor temperature 603 and indoor temperature 604, the required supply water temperature at a third point 607 is 16% of the difference between the design water temperature and the midpoint between the minimum and maximum water temperatures above the midpoint between the minimum and maximum water temperatures. The non-linear reset curve 601 may then be generated between the first and second boundary points 603, 604 while intersecting the third point 607.

This approach was found to very closely match the required supply water temperature for a given outdoor temperature for a wide variety of heat emitters and operating conditions.

While certain heat emitters, such as radiant floor heat, do have somewhat linear responses, the curve generated becomes more linear as the difference between maximum and minimum supply water temperatures get closer to each other. For this reason, both of the above methodologies should be capable of providing suitable curves for these systems, which typically operate at much lower water temperatures. Therefore, the proposed invention should generate a suitable outdoor reset curve without the need for the user to input the type of heat emitter used.

Figure 7:
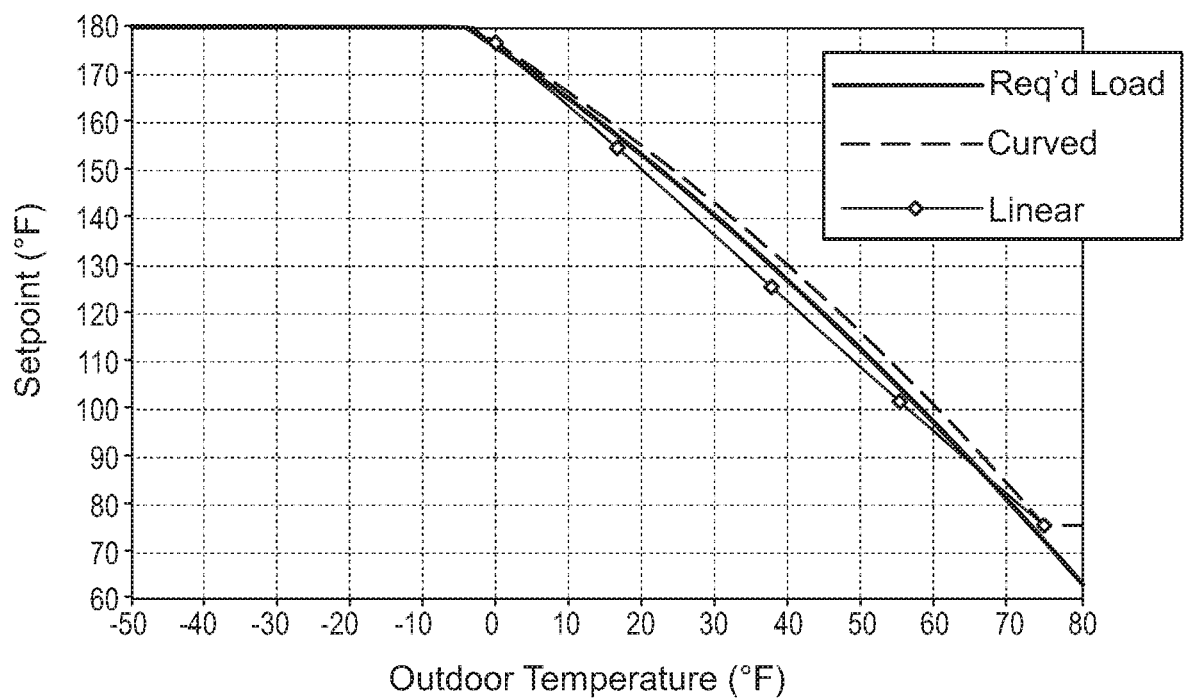
FIG. 7 is a graphical diagram representing an exemplary nonlinear reset curve of the present disclosure as applied to a required load for baseboard radiators as heat emitters.
Figure 8:
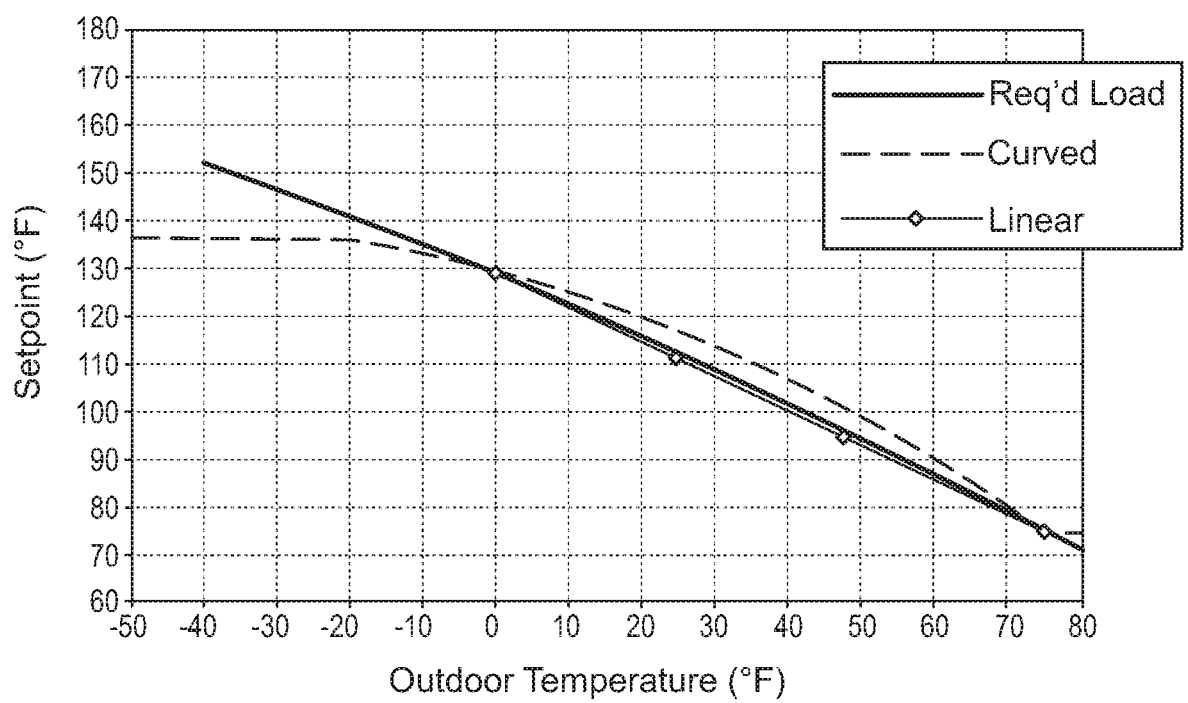
FIG. 8 is a graphical diagram representing an exemplary nonlinear reset curve of the present disclosure as applied to a required load for a more linear low-temperature application.

With reference to FIG. 7, in an example using baseboard radiators as the heat emitters, a generated non-linear reset curve tracks well with the required load. In a more linear low-temperature system as represented in FIG. 8, the generated curve does not exceed 10° F. above the minimum required temperature and is still lower than the dew point of the flue gasses throughout the majority of the curve.

In various embodiments, and by further illustrative reference to FIGS. 9-12, the system may be configured to enable extension of the generated non-linear curve in order to potentially provide warmer supply water temperatures as outdoor temperatures fall below the outdoor design temperature. Due to the nature of the second order polynomial curve and the fact that this extension would be operating outside of the prescribed boundary conditions, additional consideration must be made for this extension. To ensure satisfactory curve generation outside of the boundary conditions at outdoor temperatures below the design outdoor temperature for all configurations, the system in accordance with these embodiments will extend the curve linearly, using the same instantaneous slope as the calculated curve at the design outdoor temperature (that is, the first derivative of the reset curve evaluated at design outdoor temperature). This will cause the curve to extend tangentially to the reset curve.

Figure 9:
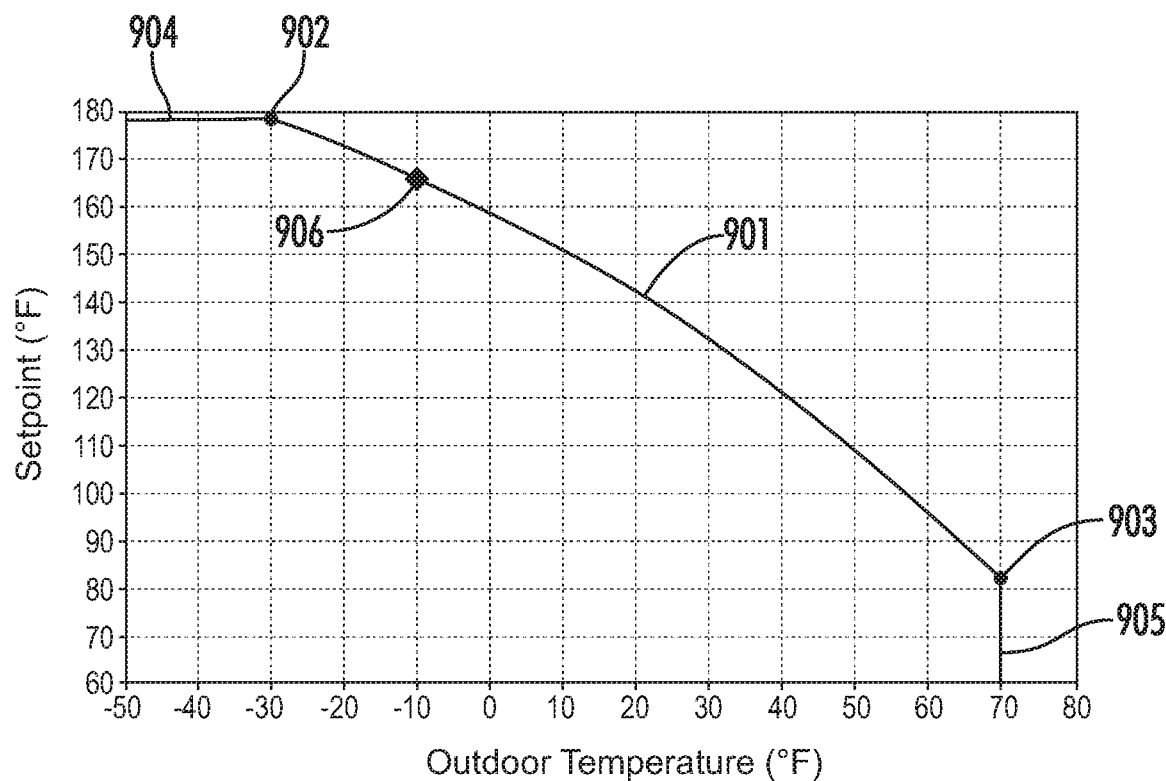
FIG. 9 is a graphical diagram representing an embodiment of the present disclosure providing a linear extension to the nonlinear reset output curve for outdoor temperatures below the minimum set point.

Referring to FIG. 9, the generated non-linear curve 901 extends between the first boundary point (for design supply temperature ~165° F. at design outdoor temperature −10° F.) 906 and the second boundary point (warmest temperature for which heating is required) 903. For outdoor temperatures extending below −10° F., a linear extension may be provided beyond the first boundary point 906, the linear extension having a slope comprising the same instantaneous slope as curve 901 at the design temperature point 906. As further discussed below, the linear extension may terminate at a point 902 associated with a ceiling wherein the water supply temperature set points are maintained at a steady level for decreasing outdoor temperatures 904. In an embodiment, systems as disclosed herein may also provide a minimum supply water temperature parameter, and/or warm weather shutdown functionality 905.

Figure 10:
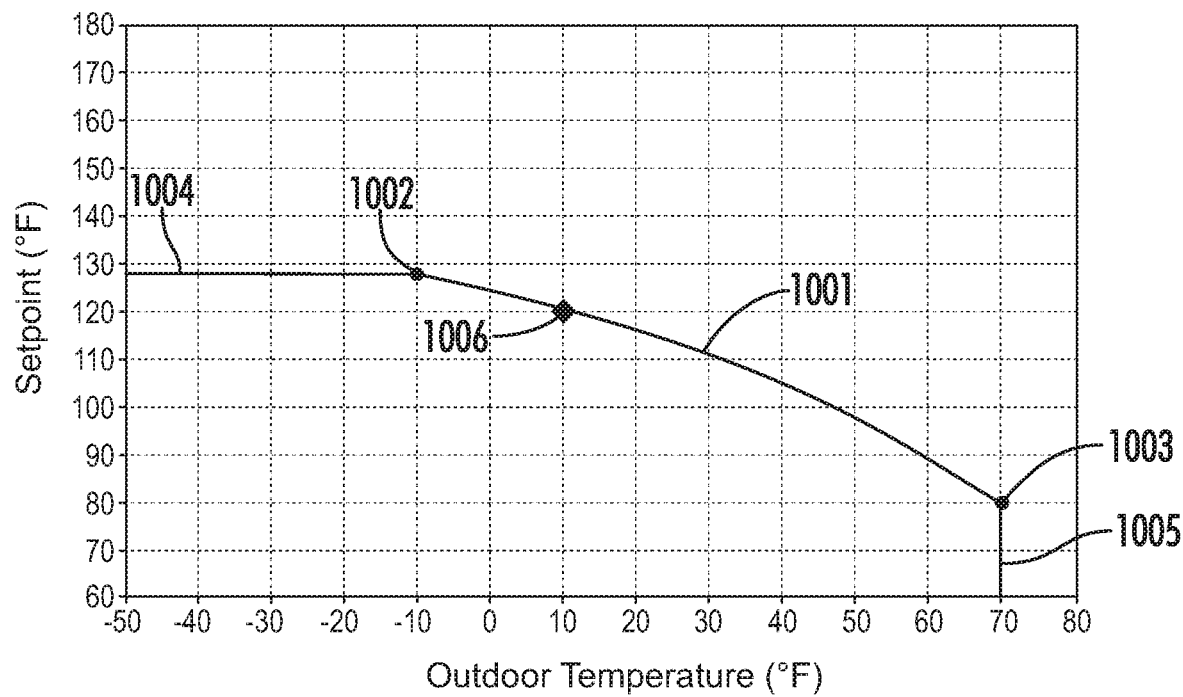
FIG. 10 is a graphical diagram representing another example of a linear extension to the nonlinear reset output curve for outdoor temperatures below the minimum set point.
Figure 11:
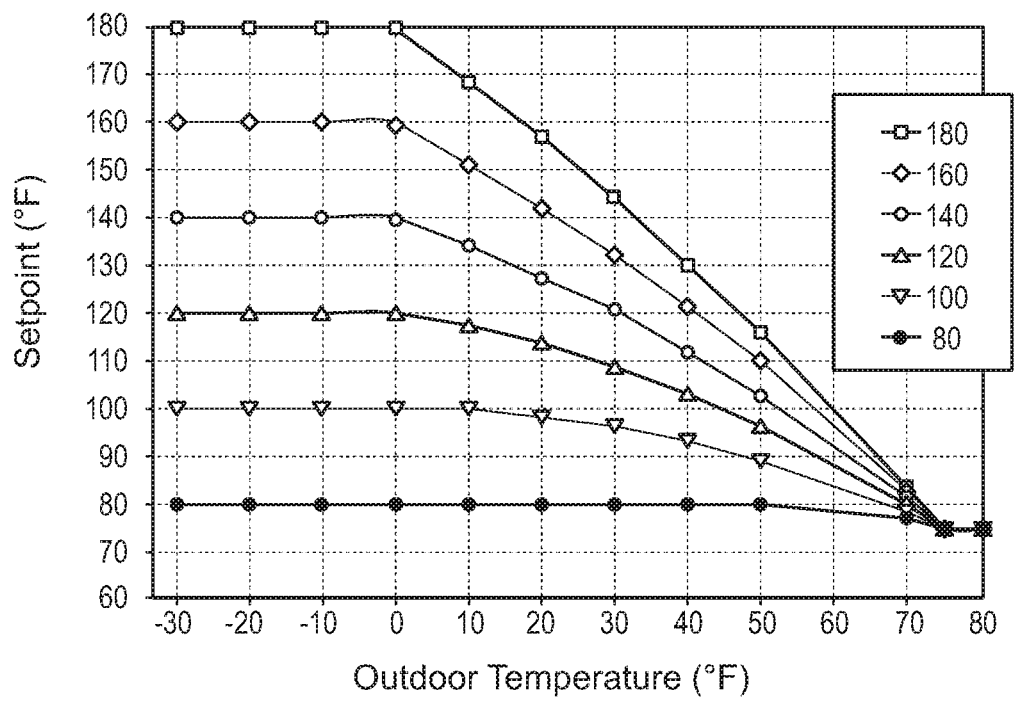
FIG. 11 is a graphical diagram representing exemplary outdoor reset curves vs. design water supply temperature as generated at 0 degree outdoor temperature according to an embodiment of the present disclosure.
Figure 12:
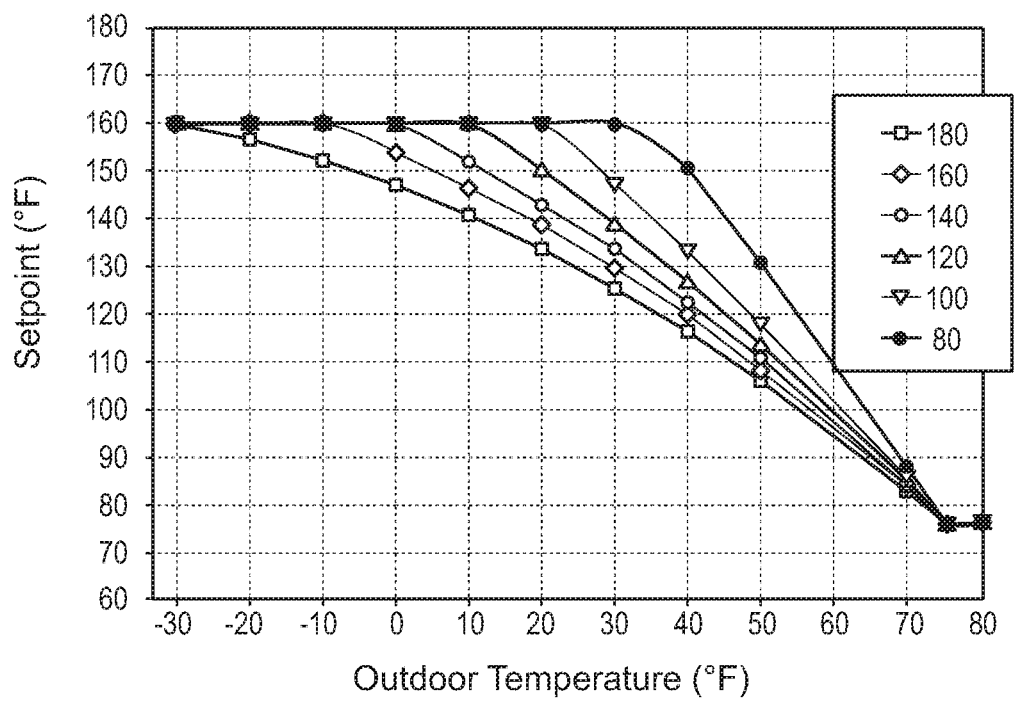
FIG. 12 is a graphical diagram representing exemplary outdoor reset curves vs. outdoor design temperature as generated at 160 degree design water supply temperature according to an embodiment of the present disclosure.

In a similar example as shown in FIG. 10, a generated non-linear curve 1001 extends between the first boundary point (for design supply temperature 120° F. at design outdoor temperature 10° F.) 1006 and the second boundary point 1003. For outdoor temperatures extending below 10° F., a linear extension may be provided having a tangential slope with respect to curve 1001 at the design temperature point 1006. The linear extension may terminate at a maximum point 1002 wherein the water supply temperature set points are capped for decreasing outdoor temperatures 1004.

In various embodiments, one or more methodologies may be employed to limit the extension of the curve in order to prevent supplying excessively high temperatures that could potentially cause damage to the heating system. Applications of such methodologies may be illustrated by reference to FIG. 13.

For example, a maximum set point parameter 1304 (which may itself be password protected) may be made available for user setting. This may apply a maximum with respect to both the set point 1303 (design supply water temperature) that can be programmed by the user or homeowner, as well as the maximum supply water temperature that can be generated by the non-linear curve 1301.

Additionally, the curve extension may also be limited to a fixed range 1305 below the outdoor design temperature 1302. As the coldest design outdoor temperature for a particular geographic region may typically be a statistically generated value, limiting extension to a fixed range below design outdoor temperature (such as 20° F.) may ensure a useful range of extension without allowing excessively high temperatures. In systems that are configured with a very steep reset curve, the same extension of 20° F. outdoor temperature may allow a supply temperature higher above the design water supply temperature than in systems with flatter curves. This will generally limit how much higher the supply temperature can extend beyond design supply water temperature in low temperatures systems, such as radiant floor heating, as compared to higher temperature systems such as baseboard radiators. One particular advantage for low temperature systems, such as radiant floor heating, may be that they generally are much more susceptible to overheating damage than are higher temperature systems such as baseboard radiators. This redundant limitation is in place to mitigate risk of excessive supply temperatures in cases where the maximum supply water temperature parameter is improperly set by the installer.

As previously mentioned, another exemplary technique may be to provide a minimum supply water temperature parameter, and/or warm weather shutdown functionality 1306.

In addition to the aforementioned techniques, a hard limit may be set in order to protect the boiler. By incorporating the outdoor reset in the boiler integrated control, an advantage is realized in that this hard limit can be set based on the constraints of the specific boiler rather than a generalized value that would be used in an external outdoor reset control.

Returning to the exemplary control methodology as shown in FIG. 4, the system may further in step 405 sense an actual outdoor temperature ($T_{out}$) and a desired indoor temperature ($T_{in\_desired}$). In an embodiment as previously noted, the desired indoor temperature may be a default setting, but alternatively may be input to the system via a user interface such as for example a thermostat, whether integrated with the boiler control or as a remote device. Any changes to the desired indoor temperature may understandably cause one or more of the boundary points for the non-linear reset curve to be adjusted as well, wherein one or more of the aforementioned steps may be repeated before continuing. The actual outdoor temperature may in various embodiments be continuously or periodically detected and fed back via a temperature sensor 308 for example as a raw signal for processing by the controller.

The system may then in step 406 heat the water temperature to a set point along the generated non-linear reset curve, as corresponding for example to the sensed outdoor temperature. One particular example of the generated set point may be provided by reference to the graph of FIG. 13, using the following base parameters:

design water temperature (coldest expected day)=Twc=120° F.;
    design outdoor temperature (coldest expected day)=$T_{OC}$=10° F.;
    water temperature (hottest day for heating)=$T_{WH}$=80° F.;
    hottest outdoor temperature where heating is required=$T_{OH}$=70° F.;

The set point may be calculated as a second order function of the above-referenced parameters such as for example:

$$SETPT = A*(T_{out}-T_{OC})^2 + B*(T_{out}-T_{OC}) + T_{WC} \qquad (\text{Eq. 11})$$

where the coefficient A is fixed as 0.005 and B=$(T_{WH}-T_{WC}-A*(T_{OH}-T_{OC})^2)/(T_{OH}-T_{OC})$, such that for a sensed outdoor temperature of for example 30° F., $$B=(80-120-0.005*(60)^2)/(60)=-41.8/60 \sim -0.7; \text{ and}$$

$$SETPT = 0.005*(20)^2 + -0.7*(20) + 120 = 108° F.$$

If for example the sensed outdoor temperature were less than 10° F., the resulting water supply temperature set point SETPT may be further corrected in accordance with previous discussion herein, such as for example where linear extension of the non-linear reset curve is enabled but only up to a maximum water temperature set point 1304 or corresponding to a minimum outdoor temperature 1305.

Figure 13:
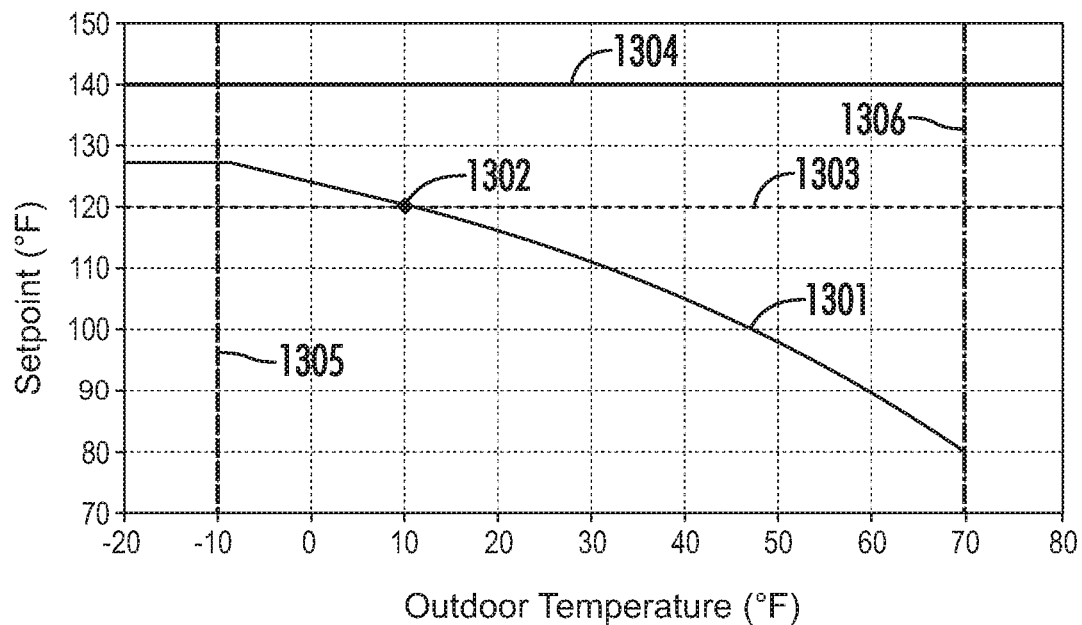
FIG. 13 is a graphical diagram representing another exemplary reset curve according to an embodiment of the present disclosure.
Figure 14:
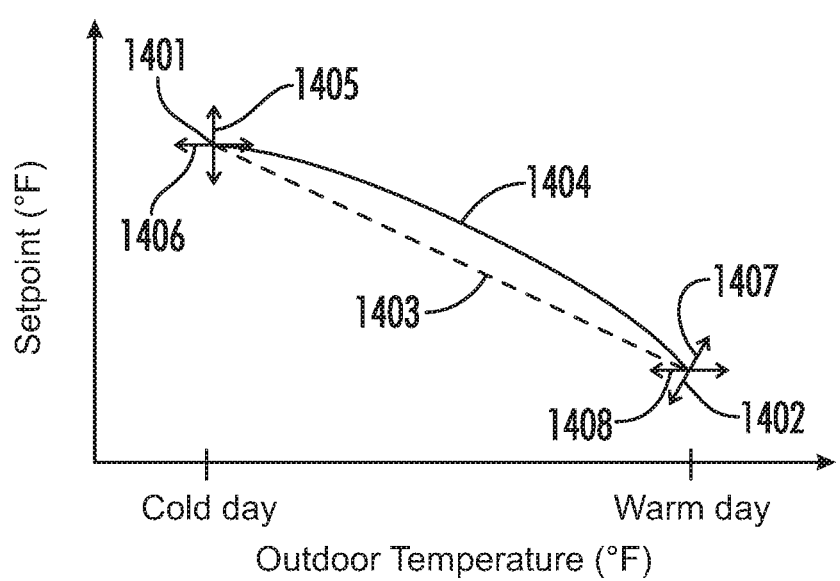
FIG. 14 is a graphical diagram representing various exemplary feedback and feed forward control adjustments according to embodiments of the present disclosure.

In various embodiments of a hydronic heating system as disclosed herein, and with further reference to FIGS. 13 and 14, the first and second boundary conditions for the non-linear reset curve, and therefore by definition the non-linear reset curve itself, may be dynamically modified in view of one or more feed forward or feedback loops corresponding to current conditions and/or user preferences.

In another exemplary embodiment of a system as disclosed herein, both of the outdoor temperature and the supply water temperature defining the second boundary condition point (no-load point) may be set by default to represent a reasonable assumption for indoor temperature, wherein an installer will not be required to set these parameters. In other embodiments, a user interface is provided wherein the installer will be able to independently set both of these parameters. By allowing both parameters of this point to be set individually, installers can account for other heat gains such as solar gain, which would cause the no-load point, in practice, to be different than the point where indoor temperature, supply water temperature, and outdoor temperature are all equal to each other. The controller is accordingly programmed in such a way to obtain the benefit of the simplicity of the fixed point, while allowing installers maximal control of the system to a desired level based on their experience and customers' needs.

In an embodiment, a thermostat cycling feedback loop may be provided to the hydronic heating system, wherein for example the design water supply temperature corresponding to a design "cold day" outdoor temperature may be modified based on thermostat cycling feedback associated with a thermostat contact cycling time. Such a feedback loop may be incorporated via one or more of programming in the boiler integrated controller, thermostat on-time sensors, indoor temperature sensors, and remotely initiated control signals or triggers in association with for example a residential demand control program. For example, the controller may be programmed to implement an algorithm to predict changes in indoor temperature corresponding to system activity, and varying the non-linear reset curve to meet the expected changes. This allows the boiler to react much more quickly to changes in system demand and significantly reduces temperature swings in the system and reduces cycling of the boiler itself. Since an exemplary methodology for generating a non-linear reset curve as disclosed herein on setting two known points (e.g., coldest expected day for a given location and desired indoor temperature), only a single parameter needs to be adjusted to optimize the curve. As represented in FIG. 14, the design water supply temperature 1401 may be dynamically modified 1405, wherein the controller further regenerates the non-linear reset curve 1404 with respect to the second boundary point 1402.

In an embodiment, the controller may be configured to detect and count a number of actual outdoor temperature measurements below for example the design minimum outdoor temperature (i.e., corresponding to the design water supply temperature set point). Based on frequent operation at outdoor temperatures below the coldest expected outdoor temperature, or such as for example upon a threshold number of such occurrences, the controller may dynamically adjust the minimum outdoor temperature 1406 and the non-linear outdoor reset curve 1404. In an embodiment, the controller may automatically determine an appropriate modification to the minimum (coldest) outdoor temperature based upon for example historical analytics.

In an embodiment, an outdoor area 307 associated with the hydronic heating system 300 may include a first outdoor temperature sensor 308 in an irradiated portion of the building or structure, and a second outdoor temperature sensor 309 in a shaded portion of the building or structure. By implementing at least two such sensors, the controller 303 may effectively set (see 1408 in FIG. 14) the difference between the indoor temperature and the outdoor temperature defining the warm day (i.e., wherein heating is no longer necessary) to account for solar gain.

In an embodiment, an actual indoor temperature may be obtained via an indoor temperature feedback loop, including a temperature sensor 306 positioned within the defined indoor area such as may for example be implemented via a room thermostat. The controller may be configured in association with inputs from the indoor temperature feedback loop to adjust 1407 the "warm day" outdoor temperature setting 1402. In an embodiment the controller adjusts the warmest temperature setting along a line with a slope of 1 to account for changes in the indoor air temperature. In an embodiment the controller may detect discrepancies between the actual indoor temperature and an expected indoor temperature based on the regulated water supply temperature, wherein additional calculations may be performed relating to heat loss from the building, and as a result further with respect to the optimal non-linear reset curve.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

The term "coupled" means at least either a direct connection between the connected items or an indirect connection through one or more passive or active intermediary devices.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The term "communications network" as used herein with respect to data communication between two or more parties or otherwise between communications network interfaces associated with two or more parties may refer to any one of, or a combination of any two or more of, telecommunications networks (whether wired, wireless, cellular or the like), a global network such as the Internet, local networks, network links, Internet Service Providers (ISP's), and intermediate communication interfaces.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A hydronic water heating system for a defined area, the system comprising:
   a boiler assembly having a water input and a water output;
   a controller integrated within the boiler assembly and configured to regulate the heating of water from the water input to a temperature corresponding to a set point along a nonlinear output reset curve;

a user interface configured to receive a user-defined water temperature set point corresponding to a reference outdoor temperature, wherein the output reset curve is generated in part based on the user-defined water temperature set point and comprises a first water temperature set point corresponding to a minimum outdoor temperature with respect to the defined area, a second water temperature set point corresponding to a maximum outdoor temperature for which heating is required in the defined area, and a plurality of water temperature set points between the first and second set points and corresponding to outdoor temperatures between the minimum and maximum outdoor temperatures with respect to the defined area; and a thermostat cycling feedback loop wherein the controller is further configured to dynamically adjust at least the first water temperature set point and the corresponding output reset curve based on a thermostat cycling input.

2. The hydronic water heating system of claim 1, wherein the controller is configured to generate the outdoor reset curve based further in part on aggregated data corresponding to heat output functions for a plurality of types of heat emitters, wherein the boiler assembly having the outdoor reset curve is configured to provide the water output for use with any one of the plurality of types of heat emitters.

3. The hydronic water heating system of claim 1, wherein the controller is configured to generate the outdoor reset curve as a multi-order polynomial function of output water temperature corresponding to a desired indoor temperature for each of the plurality of outdoor temperatures between the minimum and maximum outdoor temperatures.

4. The hydronic water heating system of claim 3, wherein the controller is configured to generate the outdoor reset curve using a fixed multi-order coefficient relative to the first and second water temperature set points, and each of the plurality of water temperature set points is determined as a greater value of the user-defined water temperature set point or a water temperature set point corresponding to an actual outside temperature along the curve generated according to the fixed multi-order coefficient.

5. The hydronic water heating system of claim 3, wherein the controller is configured to generate the outdoor reset curve as connecting the first and second set points and a third water temperature set point comprising a midpoint along a linear curve between the first and second set points as further offset by a fixed percentage factor.

6. The hydronic water heating system of claim 1, wherein the second water temperature set point and the desired indoor temperature are predetermined and stored in association with the controller, wherein only the user-defined water temperature set point corresponding to a reference outdoor temperature is required as a user input via the user interface to generate the outdoor reset curve.

7. The hydronic water heating system of claim 3, wherein an outdoor temperature corresponding to the first water temperature set point is automatically determined based on location data corresponding to a current location of the boiler assembly and obtained from a remote server via a communications network.

8. The hydronic water heating system of claim 3, further comprising a desired indoor temperature feedback input to the controller from the user interface, wherein the controller dynamically generates a new outdoor reset curve for changes in the desired indoor temperature.

9. The hydronic water heating system of claim 1, further comprising an outdoor temperature feedback loop configured to provide an actual outdoor temperature measurement with respect to the defined area.

10. The hydronic water heating system of claim 9, wherein the outdoor temperature feedback loop comprises at least one outdoor temperature sensor associated with a shaded outdoor area and at least one outdoor temperature sensor associated with an irradiated outdoor area, and the controller is configured to dynamically adjust at least the second water temperature set point and the corresponding output reset curve based on actual outdoor temperature measurements from the outdoor temperature sensors.

11. The hydronic water heating system of claim 9, wherein the controller is configured to determine a number of actual outdoor temperature measurements below the minimum outdoor temperature corresponding to the first water temperature set point, and dynamically adjust the minimum outdoor temperature and the outdoor reset curve based on the determined number exceeding a threshold value.

12. The hydronic water heating system of claim 11, wherein the controller is configured to generate a linear outdoor reset curve between a maximum water temperature set point and the first water temperature set point, and a slope of the linear outdoor reset curve is equal to an instantaneous slope of the nonlinear outdoor reset curve at the first water temperature set point.

13. The hydronic water heating system of claim 1, further comprising an indoor temperature feedback loop configured to provide an actual indoor temperature measurement with respect to the defined area, wherein the controller is configured to compare actual indoor temperature measurements to expected indoor temperature measurements for a respective outdoor temperature and water temperature, and dynamically adjust at least the second water temperature set point and the corresponding outdoor reset curve based on detected changes in the indoor temperature.

14. A hydronic water heating system for a defined area, the system comprising:

a boiler assembly having a water input and a water output;

a controller integrated within the boiler assembly and configured to regulate the heating of water from the water input to a temperature corresponding to a set point along a nonlinear output reset curve;

a user interface configured to receive a user-defined water temperature set point corresponding to a reference outdoor temperature, wherein the output reset curve is generated in part based on the user-defined water temperature set point and comprises a first water temperature set point corresponding to a minimum outdoor temperature with respect to the defined area, a second water temperature set point corresponding to a maximum outdoor temperature for which heating is required in the defined area, and a plurality of water temperature set points between the first and second set points and corresponding to outdoor temperatures between the minimum and maximum outdoor temperatures with respect to the defined area; and an outdoor temperature feedback loop configured to provide an actual outdoor temperature measurement with respect to the defined area, wherein the controller is configured to determine a number of actual outdoor temperature measurements below the minimum outdoor temperature corresponding to the first water temperature set point, and dynamically adjust the minimum outdoor temperature and the outdoor reset curve based on the determined number exceeding a threshold value.

15. The hydronic water heating system of claim 14, wherein the second water temperature set point and the desired indoor temperature are predetermined and stored in association with the controller, wherein only the user-defined water temperature set point corresponding to a reference outdoor temperature is required as a user input via the user interface to generate the outdoor reset curve.

16. The hydronic water heating system of claim 14, wherein the controller is configured to generate the outdoor reset curve as a multi-order polynomial function of output water temperature corresponding to a desired indoor temperature for each of the plurality of outdoor temperatures between the minimum and maximum outdoor temperatures.

17. The hydronic water heating system of claim 15, wherein the controller is configured to generate the outdoor reset curve using a fixed multi-order coefficient relative to the first and second water temperature set points, and each of the plurality of water temperature set points is determined as a greater value of the user-defined water temperature set point or a water temperature set point corresponding to an actual outside temperature along the curve generated according to the fixed multi-order coefficient.

18. The hydronic water heating system of claim 15, wherein the controller is configured to generate the outdoor reset curve as connecting the first and second set points and a third water temperature set point comprising a midpoint along a linear curve between the first and second set points as further offset by a fixed percentage factor.

19. The hydronic water heating system of claim 15, wherein an outdoor temperature corresponding to the first water temperature set point is automatically determined based on location data corresponding to a current location of the boiler assembly and obtained from a remote server via a communications network.

20. The hydronic water heating system of claim 15, further comprising a desired indoor temperature feedback input to the controller from the user interface, wherein the controller dynamically generates a new outdoor reset curve for changes in the desired indoor temperature.

21. The hydronic water heating system of claim 14, wherein the controller is configured to generate a linear outdoor reset curve between a maximum water temperature set point and the first water temperature set point, and a slope of the linear outdoor reset curve is equal to an instantaneous slope of the nonlinear outdoor reset curve at the first water temperature set point.

22. The hydronic water heating system of claim 14, further comprising a thermostat cycling feedback loop wherein the controller is further configured to dynamically adjust at least the first water temperature set point and the corresponding output reset curve based on a thermostat cycling input.

23. The hydronic water heating system of claim 14, further comprising an indoor temperature feedback loop configured to provide an actual indoor temperature measurement with respect to the defined area, wherein the controller is configured to compare actual indoor temperature measurements to expected indoor temperature measurements for a respective outdoor temperature and water temperature, and dynamically adjust at least the second water temperature set point and the corresponding outdoor reset curve based on detected changes in the indoor temperature.

24. A hydronic water heating system for a defined area, the system comprising:

a boiler assembly having a water input and a water output;

a controller integrated within the boiler assembly and configured to regulate the heating of water from the water input to a temperature corresponding to a set point along a nonlinear output reset curve;

a user interface configured to receive a user-defined water temperature set point corresponding to a reference outdoor temperature, wherein the output reset curve is generated in part based on the user-defined water temperature set point and comprises a first water temperature set point corresponding to a minimum outdoor temperature with respect to the defined area, a second water temperature set point corresponding to a maximum outdoor temperature for which heating is required in the defined area, and a plurality of water temperature set points between the first and second set points and corresponding to outdoor temperatures between the minimum and maximum outdoor temperatures with respect to the defined area, wherein the controller is configured to generate the outdoor reset curve as connecting the first and second set points and a third water temperature set point comprising a midpoint along a linear curve between the first and second set points as further offset by a fixed percentage factor.

25. The hydronic water heating system of claim 24, wherein the second water temperature set point and the desired indoor temperature are predetermined and stored in association with the controller, wherein only the user-defined water temperature set point corresponding to a reference outdoor temperature is required as a user input via the user interface to generate the outdoor reset curve.

26. The hydronic water heating system of claim 24, wherein an outdoor temperature corresponding to the first water temperature set point is automatically determined based on location data corresponding to a current location of the boiler assembly and obtained from a remote server via a communications network.

27. The hydronic water heating system of claim 24, wherein the controller is configured to generate the outdoor reset curve as a multi-order polynomial function of output water temperature corresponding to a desired indoor temperature for each of the plurality of outdoor temperatures between the minimum and maximum outdoor temperatures.

28. The hydronic water heating system of claim 27, further comprising a desired indoor temperature feedback input to the controller from the user interface, wherein the controller dynamically generates a new outdoor reset curve for changes in the desired indoor temperature.

29. The hydronic water heating system of claim 24, further comprising an outdoor temperature feedback loop configured to provide an actual outdoor temperature measurement with respect to the defined area.

30. The hydronic water heating system of claim 29, wherein the controller is configured to
- determine a number of actual outdoor temperature measurements below the minimum outdoor temperature corresponding to the first water temperature set point, and
- dynamically adjust the minimum outdoor temperature and the outdoor reset curve based on the determined number exceeding a threshold value.

31. The hydronic water heating system of claim 29, wherein the controller is configured to generate a linear outdoor reset curve between a maximum water temperature set point and the first water temperature set point, and a slope of the linear outdoor reset curve is equal to an instantaneous slope of the nonlinear outdoor reset curve at the first water temperature set point.

32. The hydronic water heating system of claim 24, further comprising a thermostat cycling feedback loop wherein the controller is further configured to dynamically adjust at least the first water temperature set point and the corresponding output reset curve based on a thermostat cycling input.

33. The hydronic water heating system of claim 24, further comprising an indoor temperature feedback loop configured to provide an actual indoor temperature measurement with respect to the defined area,
- wherein the controller is configured to
  - compare actual indoor temperature measurements to expected indoor temperature measurements for a respective outdoor temperature and water temperature, and
  - dynamically adjust at least the second water temperature set point and the corresponding outdoor reset curve based on detected changes in the indoor temperature.

\* \* \* \* \*